United States Patent
Starr

(10) Patent No.: US 7,596,211 B2
(45) Date of Patent: *Sep. 29, 2009

(54) MULTI-PAIR BROADBAND TRANSMISSION SYSTEM

(75) Inventor: Thomas J. J. Starr, Barrington, IL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 790 days.

This patent is subject to a terminal disclaimer.

(21) Appl. No.: 11/266,965

(22) Filed: Nov. 4, 2005

(65) Prior Publication Data

US 2006/0056499 A1   Mar. 16, 2006

Related U.S. Application Data

(63) Continuation of application No. 10/621,134, filed on Jul. 16, 2003, now Pat. No. 6,973,170, which is a continuation of application No. 10/027,179, filed on Dec. 21, 2001, now Pat. No. 6,625,262.

(51) Int. Cl.
 *H04M 11/00* (2006.01)
(52) U.S. Cl. .................................................. 379/93.08
(58) Field of Classification Search ............. 379/93.08, 379/93.01, 93.28, 93.31; 375/222
See application file for complete search history.

(56) References Cited

U.S. PATENT DOCUMENTS

| | | | | |
|---|---|---|---|---|
| 6,625,262 | B2* | 9/2003 | Starr | 379/93.08 |
| 6,763,019 | B2* | 7/2004 | Mehta et al. | 370/352 |
| 7,106,854 | B2* | 9/2006 | Gough et al. | 379/398 |
| 7,190,716 | B2* | 3/2007 | Norrell et al. | 375/222 |

* cited by examiner

*Primary Examiner*—Stella L Woo
(74) *Attorney, Agent, or Firm*—Toler Law Group

(57) ABSTRACT

A high-speed data transmission network system (8) is provided. The system (8) includes a plurality of subscriber premises (12) that transmit a first upstream signal (28) on a first frequency band to a central office or a remote terminal (10), which is in communication with the plurality of subscriber premises (12). The central office or the remote terminal (10) broadcasts a downstream signal (30) to each of the plurality of subscriber premises (12) on a second frequency band, which is higher in frequency than said first frequency band. The downstream signal (30) contains one or more subscriber group signals and a plurality of subscriber specific signals. A controller (44) provides each of the subscriber premises (12) access to one or more of the one or more subscriber group signals and to a corresponding subscriber specific signal of the plurality of subscriber specific signals. A method of performing the same is also provided. A method of adjusting performance of transmitted signals between a central office (10) and a subscriber premise (12) within the high-speed data communication network system (8) is additionally provided.

20 Claims, 1 Drawing Sheet

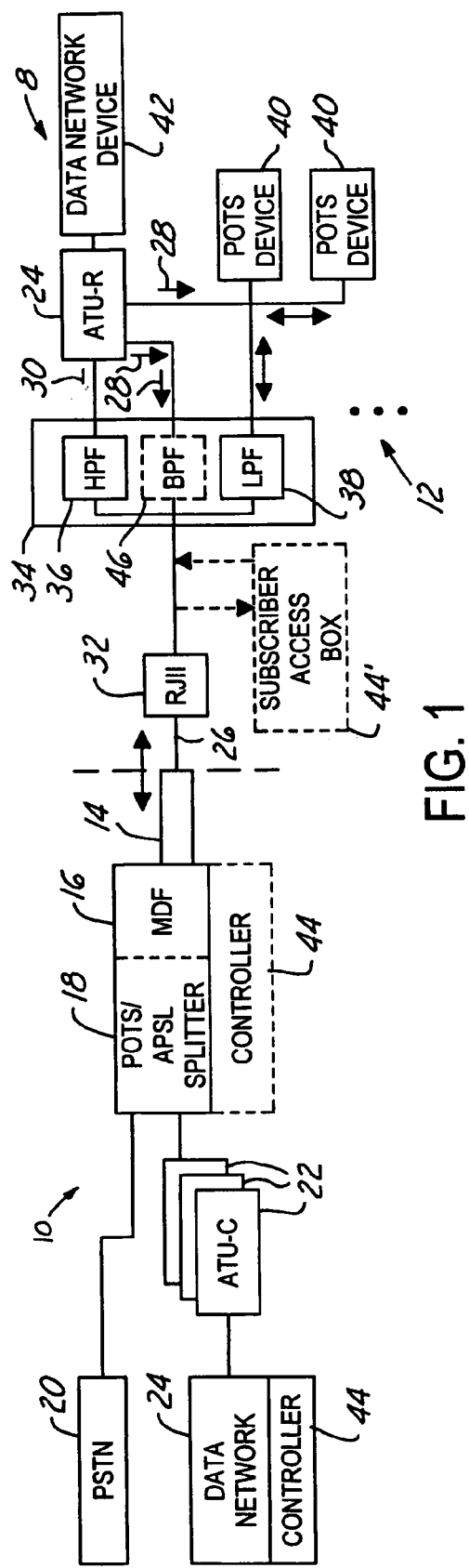
FIG. 1
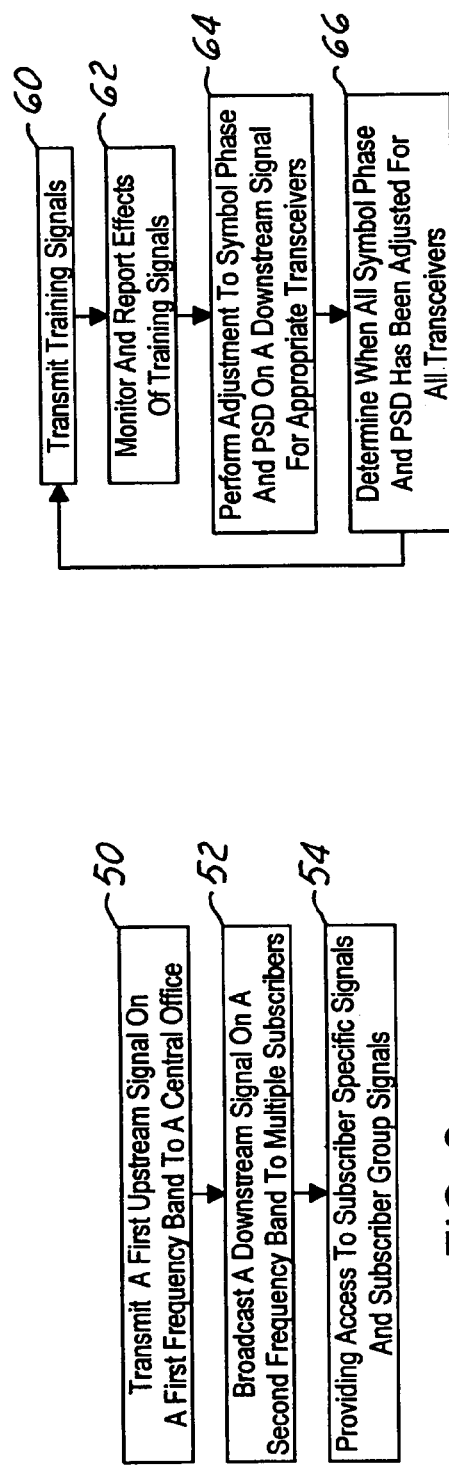
FIG. 3
FIG. 2

MULTI-PAIR BROADBAND TRANSMISSION SYSTEM

CROSS REFERENCE TO A RELATED APPLICATION

This application is a continuation of U.S. patent application Ser. No. 10/621,134, filed on Jul. 16, 2003, now U.S Pat. No. 6,973,170 which is a continuation of U.S. patent application Ser. No. 10/027,179, filed on Dec. 21, 2001 and issued as U.S. Pat. No. 6,625,262.

FIELD OF THE INVENTION

The present invention relates to data transmission systems, and more particularly, concerns transmitting, receiving, and accessing information for XDSL and the like, transmission systems.

BACKGROUND OF THE INVENTION

Telephone cables consist of a large number of twisted wire-pairs. Each twisted wire-pair conveys information to and from a particular customer. Digital Subscriber Line (DSL) technology is commonly used to allow for simultaneous voice and data traffic to coexist over a communication channel comprising a standard telephone transmission line. Typically, the standard telephone transmission line comprises an unshielded twisted-pair of copper wire having a gage of 22-26 AWG. Twisted pairs, which can be used to connect a central telephone system to a subscriber's telephone system can support bandwidths up to 12 MHz through the use of digital signal processing (DSP) technology. Thus, they can be used for bandwidth-intensive applications, such as Internet access and video-on demand, as well as for carrying voice traffic. Frequency division multiplexing is used so that the plurality of signals, each occupying a different frequency band, can be simultaneously sent over the same transmission line.

Because there are different varieties of digital subscriber line technology, it is sometimes generally referred to as XDSL wherein the "X" represents a specific DSL standard such as HDSL for high bit rate digital subscriber line or RADSL for rate adaptive digital subscriber line, etc. As the name implies, ADSL is asymmetric in that the data transmission rates differ in the upstream and downstream direction. In the context of a phone system, the downstream direction is defined as transmissions from the central office to a remote location that may be an end user such as a residence or business. The reverse signal corresponds to transmissions in an upstream direction, i.e., from the remote location to the central office. ADSL data traffic bandwidth for CAP (carrierless amplitude and phase) modulation is typically from about 35 kHz to 1.1 MHz. The bandwidth for ADSL data traffic using DMT (discreet multi-tone modulation) is from approximately 26 kHz to 1.1 MHz. A separator is typically used in DSL systems to separate the upstream (transmit) and downstream (receive) signals on the twisted-pair transmission line.

High speed DSL transmission systems operating over twisted copper pair telephone lines are performance limited due to signal crosstalk between the wire pairs. The severity of the crosstalk increases with frequency. Additionally, as frequency increases, attenuation of transmitted signals also increases. Increases in crosstalk and attenuation of transmitted signals causes degradation of signal quality and restrictions on useful bandwidth for transmission. Restricting useful bandwidth further limits information capacity and speed of information transmission of telephone cables. Crosstalk is most severe within a central office where main feeder cables carry more wires than branch feeder or distribution cables. Hence, crosstalk is greatest at central offices and interferes more with weak signals entering offices than with stronger signals leaving offices. The result is that higher bit rates can be transmitted to users, referred to as downstream data transfer, than from users, referred to as upstream data transfer.

Other data transmission systems also exist, such as systems using an inverse multiplexed asynchronous transfer mode (IMA) that exhibit similar transmission limitations. IMA is one example among many of system methods used to divide information, on a signal to be transmitted, into multiple sections and therefore, multiple signals. In so doing, allowing for higher speed transmission, by transmitting the divided up sections on multiple twisted wire pairs and recombining the original information on a receiving end of the system. The receiving end contains formatting to recombine the originally transmitted signals. Data transmission systems using IMA and similar methods are limited by the number of wire pairs and time involved in dividing and recombining signals.

Existing telephone cabled systems, such as XDSL and systems utilizing IMA, employ two or more wire pairs to achieve a greater total information capacity. In these systems, each twisted wire pair conveys a unique portion of total information payload. The payload is sent on the twisted wire pairs within a main telephone cable. No attempt is performed, to improve or alter transmission of signals, on any other wire pairs within the telephone cable. Therefore, even though the information capacity is increased due to an increase in the number of wire pairs being used, crosstalk and attenuation of transmission signals remains a limiting factor in XDSL and IMA style systems.

Thus, there exists a need for a high speed data information transmission system that minimizes crosstalk and attenuation of transmitted signals, which provides for an increase in information capacity and transmission performance without an increase in the number of required twisted wire pairs.

BRIEF DESCRIPTION OF THE DRAWINGS

For a more complete understanding of this invention, reference should now be made to the embodiments illustrated in greater detail in the accompanying drawings and described below by way of examples of the invention.

In the drawings:

FIG. 1 is a block diagram of a high-speed data transmission system in accordance with an embodiment of the present invention;

FIG. 2 is a logic flow diagram illustrating a method of transmitting, receiving, and providing access to information within a high-speed data transmission system in accordance with an embodiment of the present invention; and FIG. 3 is a logic flow diagram illustrating a method of adjusting performance of transmitted signals between a central office and a subscriber premise in accordance with an embodiment of the present invention.

DETAILED DESCRIPTION OF THE INVENTION

While the present invention is described with respect to a method and apparatus for providing access to information on a telephone cable, the present invention may be adapted to be used in various systems including: XDSL, IMA, or other systems requiring high speed data transmission. The present invention may also be applied to various distribution areas. A distribution area for example may consist of approximately 600 living units, sharing a common distribution cable typically having approximately 800 pairs of wires.

In the examples below, a high speed data transmission system and method are provided which minimize crosstalk and attenuation of transmitted signals and provides for a increase in information capacity and performance with out an increase in the number of required twisted wire pairs. In particular, a high-speed data transmission network system is provided. The system includes a plurality of subscriber premises that transmit a first upstream signal on a first frequency band to a central office, which is in communication with the plurality of subscriber premises. The central office broadcasts a downstream signal to each of the plurality of subscriber premises on a second frequency band, which is higher in frequency than said first frequency band. The downstream signal contains one or more subscriber group signals and a plurality of subscriber specific signals. A controller provides each of the subscriber premises access to one or more of the one or more subscriber group signals and to a corresponding subscriber specific signal of the plurality of subscriber specific signals. A method of performing the same is also provided. A method of adjusting performance of transmitted signals between a central office and a subscriber premise within the high-speed data communication network system is additionally provided.

Referring now to FIG. 1, a block diagram of a high-speed data transmission network system 8 in accordance with an embodiment of the present invention is shown. The diagram of FIG. 1 is divided into two portions, one of which represents a telco central office 10, which may be a remote terminal, and the other of which represents a plurality of subscriber premises 12. Communication channel 14 represents main feeder cables to the telco central office 10. The communications channel 14 may also represent distribution cable from a remote terminal to customers. These cables interface with a main distribution frame (MDF) 16 within the central office 10. A splitter 18 divides the plain old telephone service (POTS) signals from higher frequency XDSL signals. The POTS signals are routed through the splitter 18 to a worldwide Public Switched Telephone Network 20. The XDSL signals are routed to a plurality of XDSL transceiver units (ATU-C) 22 each of which correspond to a respective XDSL transceiver units (ATU-R) 24 remotely located at each of the subscriber premises 12. The ATU-Cs 22 connect through the central office XDSL subscriber loop and data network interface to access an Internet service provider and other data networks 24.

At least a portion of the communication channel 14 that connects the central office 10 with the subscriber premises 12 comprises a twisted wire pair subscriber loop 26. The frequency bands transmitted along the twisted wire pair subscriber loop 26, between the central office 10 and the subscriber premises 12, includes a low frequency POTS and upstream data communication band and a higher frequency downstream data communication band. Upstream data is represented by arrows 28 and downstream data is represented by arrows 30. The twisted wire pair subscriber loop 26 connects to the subscriber premises 12 through a standard RJ11 modular connector 32. A splitter 34 including a high pass filter 36 and a low pass filter 38 divide the downstream data communication band and upstream communication bands from the baseband POTS. The POTS signals are then transmitted to POTS devices 40 such as a telephone or facsimile machine. The higher frequency data signals are communicated to the ATU-R 24 to transmit data signals to the subscriber's network device 42 such as a computer. Of course, in a splitter-less XDSL configuration, the splitter 30 would not be necessary and the ATU-R 36 would incorporate a device for filtering out the POTS band communication signals.

The present invention also includes a controller 44 located in the central office 10. Controller 44 may be stationed at the data network 24, as shown, or may also be stationed at other areas within the central office 10, such as at the MDF 16 and splitter 18. The controller 44 may also be in the form of a subscriber access box 44' located within the subscriber network 12. The controller 44 is preferably microprocessor-based such as a computer having a central processing unit, memory (RAM and/or ROM), and associated input and output buses. Controller 44 provides each subscriber premises 12 access to one or more of many subscriber group signals and to a corresponding subscriber-specific signal. All subscriber group signals and subscriber-specific signals may be transmitted to an allocated number of subscriber premises or to all of the subscriber premises 12.

The upstream signals 28 and the downstream signals 30 are transmitted using one of the following multiplexing techniques: a time-multiplexing technique, a frequency multiplexing technique, or a statistical multiplexing technique. The upstream signals 28 and the downstream signals 30 are time multiplexed or frequency multiplexed on separate channels.

The subscriber group signals contain information that multiple subscriber network devices 42, assigned within a subscriber group, are able to access. Subscriber groups may overlap in membership. In other words, a single subscriber may belong to multiple subscriber groups. Also subscriber sub groups may exist within subscriber groups. Each subscriber, through the use of access codes or subscriber specific encryptions, accesses unique subscriber downstream data. Each subscriber may also access subscriber group specific information, of which the individual subscriber is a member. The ability to transmit all downstream data communication to all subscriber premises 12, allows the system 8 to convert leaking energy or perceived noise between twisted wire-pairs of the communication channel 14 into constructive energy as described below. So instead of destructive crosstalk between communication signals, the communication signals are actually augmented.

Also by isolating downstream data to a high frequency band and upstream data to only a low frequency band, downstream performance is enhanced and near-end-crosstalk (NEXT) is eliminated. The downstream performance is enhanced due to multiple twisted wire pairs transmitting the same information. Since NEXT is less severe at low frequencies, isolating upstream data to only low frequencies, significantly reduces crosstalk. The low frequency band may contain upstream signals only or may be bi-directional and also contain other communication such as from a facsimile or customer specific control, such as access control of the downstream signal.

The downstream signals 30 may be uniquely altered for each subscriber premise 12 to increase transmission performance. Symbol phase and power-spectral-density (PSD) of the downstream signals 30 are adjusted to subscriber specific characteristics. The subscriber specific characteristics may include frequency-dependent insertion loss and crosstalk coupling between wire pairs. The portion of the downstream signals 30 that is intended for a specific subscriber or subscriber group is adjusted to increase performance for that particular subscriber or subscriber group, respectively. The other subscriber premises or subscriber groups are not affected by the alteration, since crosstalk is minimized and each subscriber premises is only able to access their corresponding portion of the downstream signals 30. Crosstalk is typically considered an impairment in traditional data communication systems, but by adjusting symbol phase and PSD of the downstream signals 30, within the present invention, crosstalk energy is constructively aiding desired signal performance. Therefore, data transmission is performance enhanced specific to each subscriber premises. This technique is further described below.

Using the above multiplexing techniques in combination with transmitting all downstream signal information to all subscriber premises allows for increased useful signal bandwidth. Transmission frequency slots are freed-up, due to multiplexing of all downstream information in a minimal amount of frequency slots, allowing for more information to be transmitted within a frequency band. The subscriber premises 12 are able to transmit and receive enhanced cleaner signals at increased rates of speed due to a larger useful signal bandwidth.

In another embodiment of the present invention the splitter 34 may include a band pass filter 46 for at least a portion of the upstream data. The upstream signals 28 are divided into first upstream signals and second upstream signals. The first upstream signals are on a first frequency band, which is lower than a second frequency band containing the downstream signals 30. The second upstream signals are on a third frequency band, which is higher in frequency than the first frequency band but lower in frequency than the second frequency band. The first upstream signals contain voice communication, the second upstream signals contain other communication, such as from a facsimile or subscriber specific control. Subscriber specific control includes access control of the downstream signals 30.

Referring now to FIG. 2, a logic flow diagram illustrating a method of transmitting, receiving, and providing access to information within the high-speed data transmission system in accordance with an embodiment of the present invention is shown.

In step 50, the subscriber premises 12 transmit the first upstream signals on a first frequency band to the central office 10. The first upstream signals may be on a designated middle frequency band, similar to the third frequency band described above or may be multiplexed on a low frequency band, such as the first frequency band. The upstream signals include accessing information as well as other communication information.

In step 52, the central office 10 broadcasts the downstream signals 30 on a second frequency band, which is higher in frequency than the first frequency band. The second frequency band contains one or more subscriber group signals and multiple subscriber specific signals.

An advantage of providing the upstream channel in the lower frequency band is that crosstalk is less severe at lower frequencies. This lower frequency band can thus be dedicated as upstream-only, or could be bidirectional to provide the benefits of secure customer-unique communication and simple customer-specific control such as by access control for the downstream broadcast channel. In another embodiment, a two-way voice communication channel at the lowest frequency band is provided. In such a case, the upstream-only band occupies the middle and lower frequencies and the downstream broadcast band occupies the middle to upper frequencies within the channel.

The broadcast downstream channels in all embodiments can be time or statistically multiplexed among the customers, whereas the upstream transmissions from the customers to the network are conveyed as a separate channel that is either time-multiplexed or frequency-multiplexed with the downstream channel.

In step 54, the controller 44 provides access to one or more of the one or more subscriber group signals and to a corresponding subscriber specific signal for each subscriber premise. The controller 44 receives the accessing information, of step 50. The controller 44 in response to the accessing information determines the appropriate subscriber group and subscriber premise specific information for the accessing subscriber. Controller 44 then provides registered access to a portion of the downstream signals 30 to the accessing subscriber, by allowing appropriate information to be viewed on the data network device 42 corresponding with the accessing subscriber.

Referring now to FIG. 3, a logic flow diagram illustrating a method of adjusting performance of transmitted signals between the central office and the subscriber premises in accordance with an embodiment of the present invention is shown.

In step 60, when a transceiver 24 is placed at a subscriber site, the network-end unit 42 transmits training signals on the twisted wire pairs and on other twisted wire pairs within the same cable 14.

In step 62, the transceiver 24 monitors the effects of the training signals and progressively reports on received signal characteristics to the network-end unit 42, so that the end unit 42 can know when the phase and PSD on all pairs of wires had been adjusted for maximum performance.

In step 64, the network-end unit 42 performs an adjustment to the symbol phase and the PSD on the downstream signal for the appropriate transceiver(s) 24 as stated above. A portion of the downstream signal is altered, which is specifically intended for a single subscriber premises according to subscriber specific parameters.

In step 66, the network-end unit 42 determines when all the symbol phase and PSD are adjusted for all of the transceivers 24 for the jointly optimal performance. When a desired performance range for all transceivers has not been realized the network-end unit 42 returns to step 60 or initiates a fault signal. Upon satisfying the desired performance range criteria the network-end unit 42 ceases to perform further adjustments. Note that each adjustment performed for each subscriber premise 12 may differ depending upon the subscriber and subscriber group specific parameters. Thus, adjustment of the signals can differ based on which customer was to receive the signal, and different signal adjustments can be used for signals intended to be received by many or all customers. The adjustment of the phase and PSD on all pairs of wires results in the crosstalk energy constructively aiding the signal and the desired receiver. By using crosstalk as a cost effective agent the useful bandwidth can be increased and as a result, higher data transmission rates may be achieved.

The present invention provides for both customer unique two-way transmission and addressed downstream broadcast transmission. Two-way or upstream signals are transmitted at lower frequencies where existing DSL technology operates efficiently. Higher frequencies are usable by transmitting all subscriber premises information on all twisted wire pairs. The ability to increase the number of subscriber specific signals being transmitted on only one twisted wire pair provides for simple and secure control of subscriber equipment and also additional security for information being transmitted to and from the subscriber.

From the foregoing, it can be seen that there has been brought to the art a new and improved high speed data communication network system for utilization by XDSL, systems using IMA, and similar environments which provides improved performance by providing all subscriber information to be accessed at all subscriber premises through frequency band assignment and accessing techniques stated above. While the invention has been described in connection with one or more embodiments, it should be understood that the invention is not limited to those embodiments. On the contrary, the invention covers all alternatives, modifications, and equivalence, as may be included within the spirit and scope of the appended claims.

What is claimed is:

1. A system for transmitting data from a data network situated at a central office and to a plurality of subscriber network devices respectively situated at a plurality of subscriber premises, said system comprising:
   a plurality of transceiver units in communication with said data network at said central office;
   a plurality of transceiver units in respective communication with said plurality of subscriber network devices at said plurality of subscriber premises;
   a communications channel extending from said plurality of transceiver units at said central office and to said plurality of transceiver units at said plurality of subscriber premises, said communications channel having multiple frequency bands; and
   a data access controller in communication with at least one of said data network, said subscriber network devices, and said communications channel;
   wherein said transceiver units at said plurality of subscriber premises are operable to transmit upstream signals to said central office within a first frequency band on said communications channel, and said transceiver units at said central office are operable to transmit downstream signals to said plurality of subscriber premises within a second frequency band on said communications channel.

2. A data transmission system according to claim 1, wherein said central office is associated with at least one of a local telephone company and a remote terminal.

3. A data transmission system according to claim 1, wherein all said transceiver units are XDSL-compatible type transceiver units.

4. A data transmission system according to claim 1, wherein said communications channel comprises a twisted pair of wires serving as a subscriber loop.

5. A data transmission system according to claim 1, wherein said data access controller comprises an electronic microprocessor and an electronic memory.

6. A data transmission system according to claim 1, wherein said data access controller is operably stationed at a location that includes a structure selected from the group consisting of said data network, a main distribution frame (MDF), a splitter, and a subscriber access box.

7. A data transmission system according to claim 1, wherein said upstream signals include at least one of subscriber-specific data access codes, subscriber-specific data access encryptions, subscriber voice access signals, and training signals, which are received by said data access controller.

8. A data transmission system according to claim 1, wherein said downstream signals include at least one of restricted-access data and registered-access data, which are provided by said data network as permitted by said data access controller.

9. A data transmission system according to claim 1, wherein said downstream signals include data that are accessible only to a group of registered subscribers.

10. A data transmission system according to claim 1, wherein said downstream signals include data that are accessible only to a specific individually registered subscriber.

11. A data transmission system according to claim 1, wherein said second frequency band is higher in frequency than said first frequency band.

12. A system for transmitting data from a central office and to a plurality of subscriber premises, said system comprising:
    a data network situated at said central office;
    a plurality of transceiver units in communication with said data network at said central office;
    a plurality of subscriber network devices respectively situated at said plurality of subscriber premises;
    a plurality of transceiver units in respective communication with said plurality of subscriber network devices at said plurality of subscriber premises;
    a communications channel extending from said plurality of transceiver units at said central office and to said plurality of transceiver units at said plurality of subscriber premises, said communications channel having multiple frequency bands; and
    a data access controller in communication with at least one of said data network, said subscriber network devices, and said communications channel;
    wherein said transceiver units at said plurality of subscriber premises are operable to transmit upstream signals to said central office within a first frequency band on said communications channel, and said transceiver units at said central office are operable to transmit downstream signals to said plurality of subscriber premises within a second frequency band on said communications channel.

13. A data transmission system according to claim 12, wherein said plurality of subscriber network devices includes at least one personal computer.

14. A data transmission system according to claim 12, wherein said downstream signals include data that are accessible only to a group of registered subscribers.

15. A data transmission system according to claim 12, wherein said downstream signals include data that are accessible only to a specific individually registered subscriber.

16. A data transmission system according to claim 12, wherein said second frequency band is higher in frequency than said first frequency band.

17. A system for transmitting data from a data network situated at a central office and to a plurality of subscriber network devices respectively situated at a plurality of subscriber premises, said system comprising:
    a plurality of transceiver units in communication with said data network at said central office;
    a plurality of transceiver units in respective communication with said plurality of subscriber network devices at said plurality of subscriber premises;
    a communications channel extending from said plurality of transceiver units at said central office and to said plurality of transceiver units at said plurality of subscriber premises, said communications channel having multiple frequency bands; and
    a data access controller in close communication with at least one of said data network, said subscriber network devices, and said communications channel;
    wherein said transceiver units at said plurality of subscriber premises are operable to transmit upstream signals to said central office within a first frequency band on said communications channel, said transceiver units at said central office are operable to transmit downstream signals to said plurality of subscriber premises within a second frequency band on said communications channel, and said second frequency band is higher in frequency than said first frequency band.

18. A data transmission system according to claim 17, wherein said downstream signals include data that are accessible only to a group of registered subscribers.

19. A data transmission system according to claim 17, wherein said downstream signals include data that are accessible only to a specific individually registered subscriber.

20. A data transmission system according to claim 17, wherein said downstream signals include both data that are accessible only to a group of registered subscribers and data that are accessible only to a specific individually registered subscriber.

* * * * *

UNITED STATES PATENT AND TRADEMARK OFFICE
CERTIFICATE OF CORRECTION

PATENT NO. : 7,596,211 B2  Page 1 of 1
APPLICATION NO. : 11/266965
DATED : September 29, 2009
INVENTOR(S) : Thomas J. J. Starr It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 999 days.

Signed and Sealed this

Twenty-eighth Day of September, 2010

David J. Kappos
*Director of the United States Patent and Trademark Office*